(No Model.) 2 Sheets—Sheet 2.

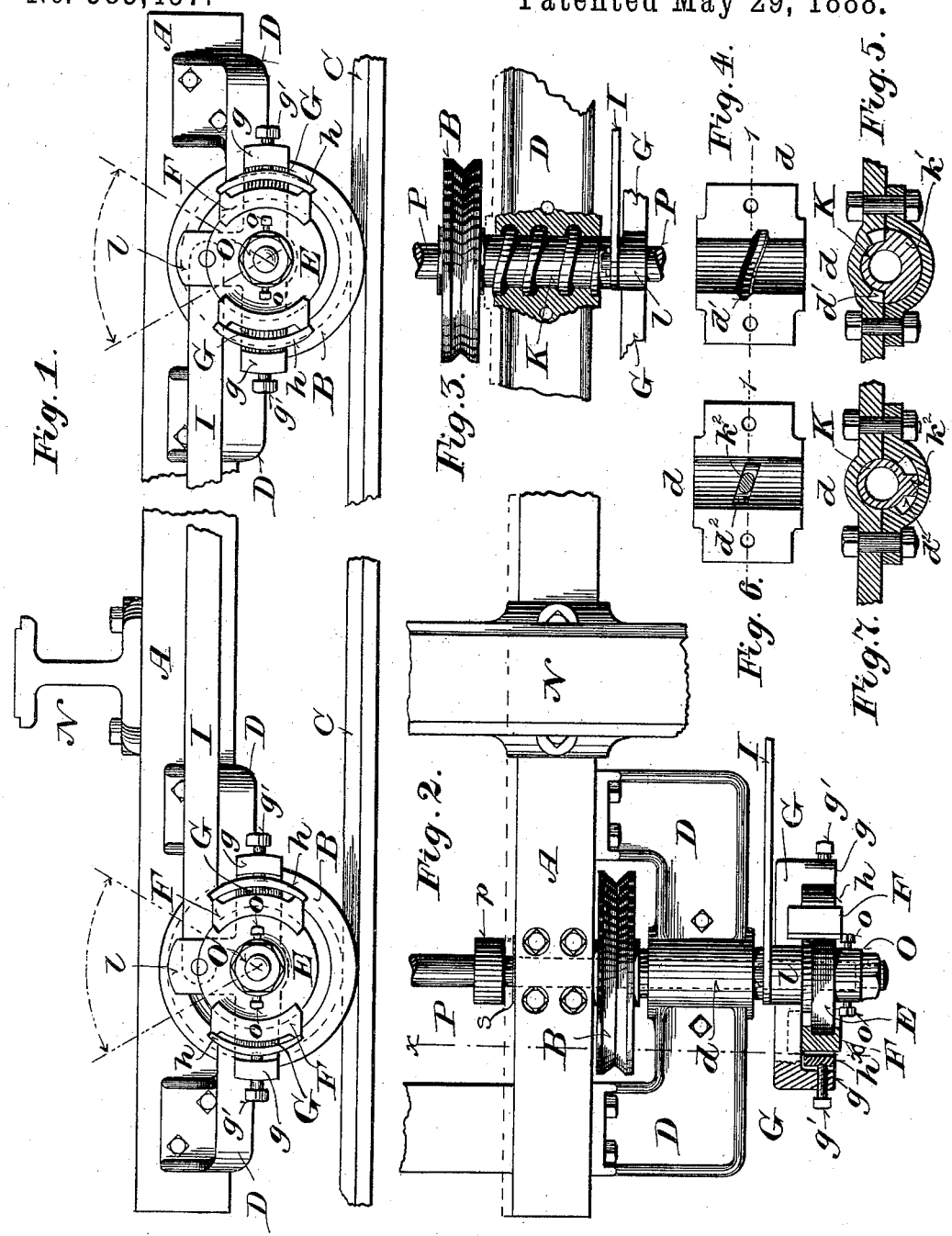

W. GOWEN.
AUTOMATIC OFFSET FOR SAW MILL CARRIAGES.

No. 383,457. Patented May 29, 1888.

Witnesses:
Chas. L. Goss.
George Goll

Inventor:
William Gowen,
By _____
Attorney.

UNITED STATES PATENT OFFICE.

WILLIAM GOWEN, OF WAUSAU, WISCONSIN.

AUTOMATIC OFFSET FOR SAW-MILL CARRIAGES.

SPECIFICATION forming part of Letters Patent No. 383,457, dated May 29, 1888.

Application filed October 5, 1886. Serial No. 215,460. (No model.)

*To all whom it may concern:*

Be it known that I, WILLIAM GOWEN, of Wausau, in the county of Marathon and State of Wisconsin, have invented certain new and useful Improvements in Automatic Offsets for Saw-Mill Carriages; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

The object of my invention is to automatically move the log out of contact with the saw when the carriage is "gigged back."

It consists, essentially, of the combination, with a carriage-frame laterally adjustable on its supporting wheels and axles, of offsetting mechanism connecting said carriage-frame and its supporting wheels or axles, and a friction wheel or wheels connected with said offsetting mechanism and arranged to operate the same; and it consists further of a screw or screws connecting said carriage-frame with its supporting wheels or axles and a friction wheel or wheels arranged to operate said screw or screws, and of certain other peculiarities of construction and arrangement hereinafter specifically set forth, and pointed out in the claims.

In the accompanying drawings like letters designate the same parts in the several figures.

Figure 8:
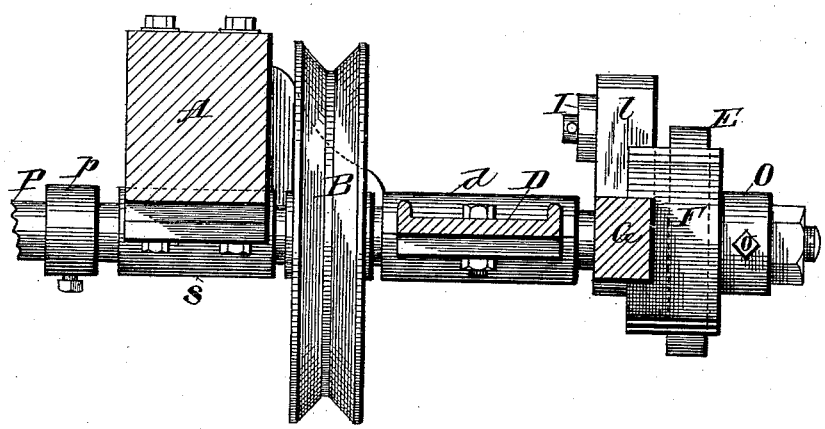
Figure 9:
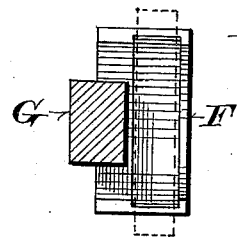

Figure 1 is a side elevation of a saw-mill carriage to which my improvements are applied. Fig. 2 is a plan view of a portion of the same, showing one of the carriage-wheels and the shifting and reversing mechanism employed therewith. Fig. 3 is a plan view of one of the shifting-screws and its connections. Fig. 4 is a plan view of the interior or lower half of a modified form of the screw-box. Fig. 5 is a vertical section of the box and a modified form of the screw employed therewith, taken on the line 1 1, Fig. 4. Figs. 6 and 7 are like views of other modifications. Fig. 8 is a cross-section taken on the line $x$ $x$, Fig. 2; and Fig. 9 is a detail view of one of the friction shoes, showing the working-face thereof in elevation.

A is the carriage-frame laterally adjustable upon its supporting axles P, and wheels B B, which are guided by and run upon ways or tracks C in the usual manner. At the side of the carriage opposite the saw the axles P are extended and bear in externally-screw-threaded sleeves K, which in turn work in internally-threaded boxes $d$, and are formed at their outer ends with cross heads or T's, G G, which, for convenience of illustration, are shown in the drawings in a position midway between the limits of their movement.

The boxes $d\ d$ are formed in and supported by brackets D D, to receive the carriage wheels B B between them and the side rail of the carriage-frame A, to which said brackets are bolted. The cross-heads G are formed with upright crank-arms $l\ l$, and at the ends with right-angled projections $g\ g$, having threaded perforations to receive the set-bolts $g'\ g'$.

Upon the ends of axles P, projecting outside of the cross-heads G, are mounted small friction-wheels E E, formed with hubs and squared nuts O O, threaded upon said axles and provided with set-bolts $o\ o$, by which they are secured in place. The screw-threaded sleeves K bear at one end against the hubs of the carriage-wheels B, (or collars employed in their place,) and at the other end against the friction-wheels E E, and have no endwise play upon the axles P. Between the projections $g\ g$ on cross-head G G and each side of the friction-wheels E E are interposed the shoes F F, concaved to bear against the faces of said friction-wheels, and bearing at the top and bottom of their outer faces against the springs $h\ h$, which in turn rest at the center against the tips of the set-bolts $g'\ g'$. The shoes F F are formed with projections extending over and engaging with the upper and lower sides of the cross-heads G G and upon the edges of their curved faces, with flanges overhanging the edges of the friction-wheels. By thus constructing said shoes they are held in place and operate the screws K through the cross-heads G when the rotation of the wheels B is reversed.

To insure the same and simultaneous operation of the several screws K and a uniform lateral movement of the carriage-frame A, I connect the crank-arms $l\ l$ of the cross-heads G G by a rod, I.

In Figs. 4, 5, 6, and 7 are shown modified forms of the offsetting-screw and the boxes in which they work.

Referring to Fig. 4, $d'$ is a curved groove formed in the lower section of the box and extending sufficiently into the upper section to permit of the necessary movement of the segment $k'$ of the screw-thread working therein, as shown in Fig. 5.

Referring to Fig. 6, $d^2$ represents an oblique groove formed in the lower half of the box, and $k^2$ a lug or projection formed upon the sleeve K and working in said groove, as seen in Fig. 7. These modifications operate in precisely the same manner and produce the same effect as the screw K, (shown in Fig. 3,) of which they are equivalents.

My improved offsetting device operates as follows: When the carriage is started forward, the friction-wheels E E, turning with the axles P and bearing in the shoes F F, turn the cross-heads G G and screws K in the same direction, the connecting rod I insuring the simultaneous operation of both or all of the screws and causing them to make the same part of a turn. The screws K, turning in boxes $d\ d$, act through brackets D D upon the carriage frame A, carrying it toward the saw till the ends of the axle-boxes $s$ strike against collars $p$, fixed for that purpose upon axles P, and the carriage-frame assumes the position indicated by dotted lines in Figs. 2 and 3. The friction-wheels now turn in the shoes F F till the movement of the carriage is reversed, when the screws K are turned in the manner described in the opposite direction and the carriage-frame A is withdrawn to its first position, the opposite ends of said axle boxes $s$ striking against the hubs of the carriage-wheels B B, arresting the further movement of said screws and carriage-frame. I prefer to form the shoes F of cast-iron and the friction-wheels with a chilled or steel face, and to work them in oil to prevent cutting.

By turning the set-bolts $g'\ g'$, bearing against the springs $h\ h$, the pressure of the shoes F F against the faces of the friction-wheels E E may be adjusted to produce the required amount of friction to operate the offsetting-screws K.

It is obvious that substantially the same results may be attained by the employment of any suitable number and arrangement of friction-wheels and screws, and that in place of two shoes, F F, with each friction-wheel one shoe may be used. In short, the details of my improved device may be variously modified without departure from the principle of its operation or the spirit of my invention.

I do not claim herein a carriage-frame laterally movable upon its trucks in combination with offsetting-screws working with nuts fixed to said frame or trucks and arranged to act transversely to the carriage on said frame and trucks; nor do I claim herein the combination, with a carriage-frame movable laterally upon its supporting-axles and offsetting mechanism for moving said carriage-frame toward and from the saw, of an arm connected with said offsetting mechanism, working in the direction of the travel of the carriage with a rack or rail, but have made that the subject-matter of an application for United States Letters Patent, filed by me July 29, 1886, Serial No. 209,365.

I claim—

1. The combination, in a saw-mill carriage, of a laterally-movable carriage-frame and its supporting wheels and axles, offsetting mechanism connecting said carriage-frame and its supporting-axles, and a friction wheel or wheels connected with said offsetting mechanism and arranged to actuate the same and to move said carriage-frame transversely to its line of travel, substantially as and for the purposes set forth.

2. The combination, in a saw-mill carriage, of the carriage-frame A, laterally movable with reference to the travel of said carriage, axle P, carriage-wheel B, friction-wheel E, applied to said axle, screw K, and shoe F, connected with said screw and bearing upon said friction-wheel, substantially as and for the purposes set forth.

3. The combination, in a saw-mill carriage, of the laterally-movable frame A, supporting-wheels B B, and axles P, screws K, mounted upon said axles and working in threaded boxes secured to the carriage-frame, cross-heads G G, formed on or attached to said screws, shoes F F, connected with said cross-heads and bearing against said friction-wheels, springs $h\ h$, interposed between said shoes, and projections $g\ g$ on said cross-heads, and set-bolts $g'\ g'$, substantially as and for the purposes set forth.

4. In a saw-mill carriage, the combination, with the supporting wheels and axles of the carriage-frame, capable of lateral movement on said axles, of a screw or screws arranged to move the carriage-frame laterally, and actuating mechanism connecting the screw or screws and one or more of the axles, substantially as and for the purposes set forth.

5. The combination, with the supporting-axles of a saw-mill carriage, of the carriage-frame arranged to move laterally thereon, a screw or screws to cause said lateral movement, a friction-wheel secured on one of the axles and provided with a friction shoe or strap to actuate said screw or screws, and mechanism connecting said shoe or strap and said screws, substantially as and for the purposes set forth.

In testimony that I claim the foregoing as my own I affix my signature in the presence of two witnesses.

WILLIAM GOWEN.

Witnesses:
CHAS. L. GOSS,
GEORGE M. GOLL.